Figure 6:
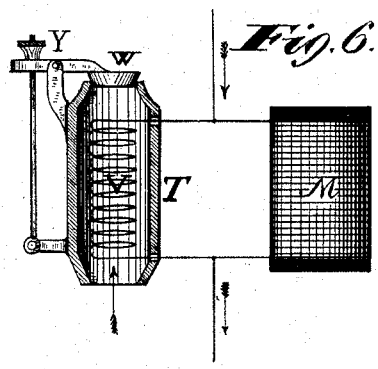

(No Model.)   2 Sheets—Sheet 1.
E. THOMSON.
REGULATOR FOR ELECTRIC CURRENTS.
No. 353,179.   Patented Nov. 23, 1886.
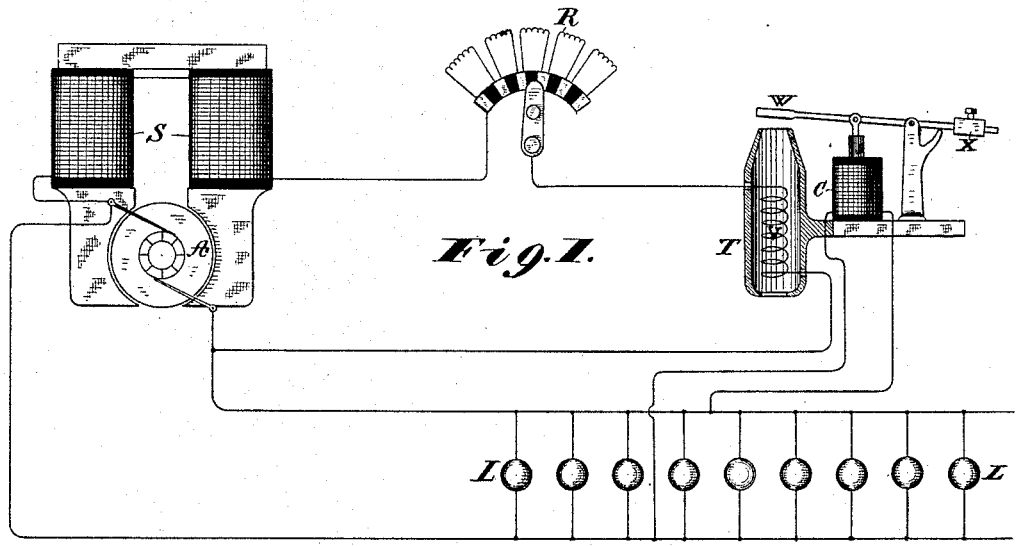
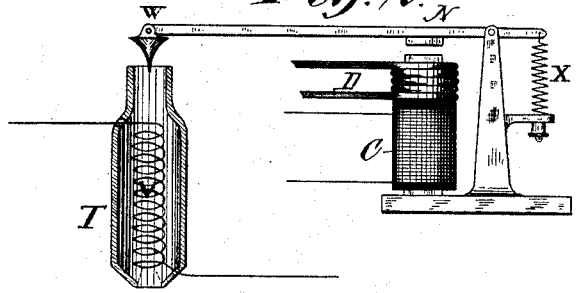
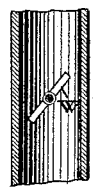
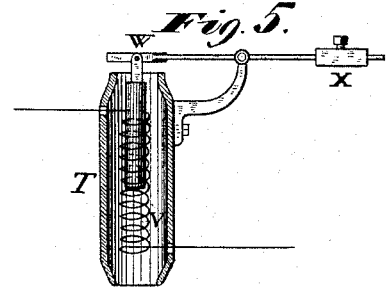
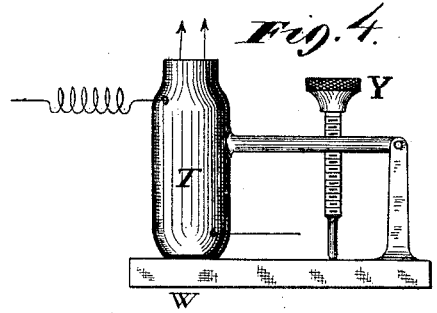
WITNESSES:
Gabriel J. W. Galster.
Wm. H. Capel.
INVENTOR
Elihu Thomson
BY
H. C. Townsend
ATTORNEY (No Model.) 2 Sheets—Sheet 2.

E. THOMSON.
REGULATOR FOR ELECTRIC CURRENTS.

No. 353,179. Patented Nov. 23, 1886.

WITNESSES:
Gabriel J. W. Galster.
Wm. H. Capel.

INVENTOR
Elihu Thomson,
BY
H. C. Townsend
ATTORNEY

UNITED STATES PATENT OFFICE.

ELIHU THOMSON, OF LYNN, MASSACHUSETTS.

REGULATOR FOR ELECTRIC CURRENTS.

SPECIFICATION forming part of Letters Patent No. 353,179, dated November 23, 1886.

Application filed June 10, 1886. Serial No. 204,779. (No model.)

*To all whom it may concern:*

Be it known that I, ELIHU THOMSON, a citizen of the United States, and a resident of Lynn, in the county of Essex and State of Massachusetts, have invented certain new and useful Regulation of Electric Currents, of which the following is a specification.

My present invention relates to a means of regulating or controlling the flow of an electric current, and is applicable, among other things, to controlling the flow of current in the field-magnet coils of a dynamo-electric machine or electric motor, or other apparatus of similar nature, so as to vary the power or efficiency of said machine.

The object of the invention is to provide a suitable means for varying the resistance in an electric circuit without employing operating contacts, which are objectionable on account of sparking and friction of the parts; and, further, to provide an adjustable resistance or rheostat by which gradual or smooth changes in resistance may be effected, so as to avoid sudden fluctuations in the power or force of the electric current.

My invention consists, essentially, of an adjustable rheostat composed of an electric conductor whose resistance is variable by changes of temperature, combined with means, independent of the current to be adjusted and flowing in said conductor, for varying the temperature of the same, so as to vary its specific resistance with a given current.

My invention consists, further, in the combination, with the field-magnet coils for a dynamo-machine, of an electric conductor whose resistance is variable by changes of temperature, and is properly connected to said coils so as to be effective in varying the flow of current in the same, and suitable means manually or automatically controlled for varying the temperature of said conductor—as for instance, by varying its exposure to a cooling or a heating influence.

My invention consists, further, in the combination, with a conductor whose resistance is variable by changes of temperature, of an inclosing-case formed of suitable material that is a non-conductor of heat, so as to limit the loss of heat by radiation or convection, and means for varying the changes of temperature produced in said conductor by external influences.

I have herein shown my invention applied to controlling the potential of a dynamo-machine so as to compensate for fluctuations of the driving-speed.

Figure 7:
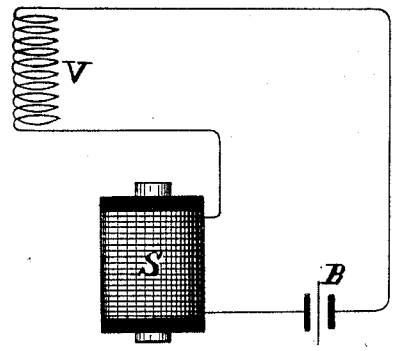
Figure 8:
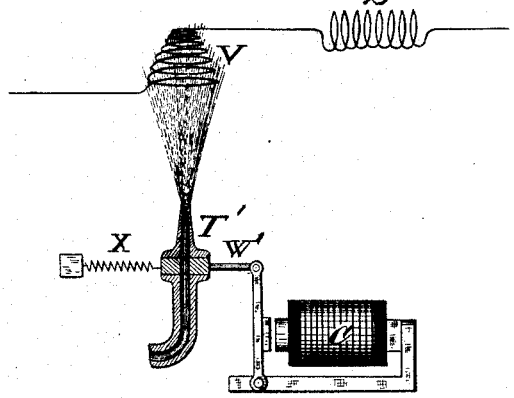
Figure 9:
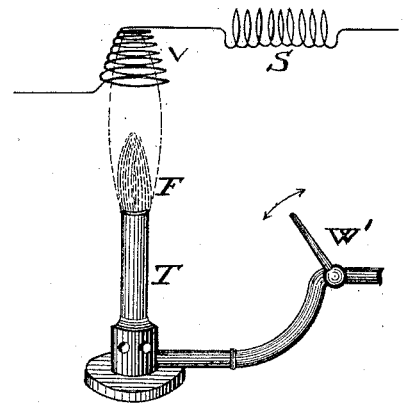

In the accompanying drawings, Figure 1 is a diagram illustrating such an application of the invention. Fig. 2 illustrates a modification in the arrangement of the resistances and the means for controlling the external heating or cooling influence. Figs. 3, 4, and 5 illustrate modifications in the details of the device. Figs. 6 and 7 show an adjustable rheostat applied in other ways to varying the flow of current in a coil. Figs. 8 and 9 show modifications in the means for varying the temperature of the conductor.

Referring to Fig. 1, A indicates the armature of a dynamo-machine of any construction, and S the field-magnet coil of the machine placed in derived circuit to the work after a manner well known in the art. The working resistances fed from mains leading from the armature are indicated at L L.

At R is indicated a variable resistance or rheostat of the usual kind, which is placed in the circuit with the coils S S, and which may be operated by hand so as to vary the excitation of the field-magnet by introducing more or less resistance into the circuit of the coils. This variable resistance may be used or not, as desired, and may be omitted where the variations to be produced in the field-magnetism are small.

V indicates a strip or coil of platinum or platino-iridium or other suitable material, whose resistance varies with changes in its temperature, and which is placed in the circuit of the coils S, as indicated.

Around the coil D is an upright tube, T, of any desired material—such, for instance, as metal, covered or lined with a non-conductor of heat—and which tube serves to prevent the lateral escape of heat from the coils V. This tube or casing might be made from earthenware, glass, or other similar material. At its bottom is an opening for the entrance of air, and at or near the top is another opening for the exit of air heated by the coil V when the latter carries an electric current. A valve, W, controls the passage of air through the tube or casing T.

The coil V is made of wire sufficiently fine to cause the coil to be considerably heated by the normal current passing through it.

When the valve W is closed, the heated air is retained in the casing, and the coil accumulates heat so as to considerably increase its resistance to the electric current; but when the valve is opened the air is permitted to circulate upward through the casing T and the coil is made cooler, thus lowering its resistance. The position of the valve determines the circulation of the cooling-current of air, and determines, therefore, the specific resistance of the coil to a given current.

The valve W may be operated by any desired means. In the present instance it is shown as moved in one direction that is to open the passage for the escape of air by the influence of an adjustable retracting-weight X, and in the other direction to prevent the escape of air by the operation of an electromagnet, C, whose movable core is attached to the lever carrying the valve, and whose coils are placed in a derived circuit to the group of working resistances L L, such as incandescent lights.

The retractor X is to be so adjusted as to open the valve when through a lowering of the difference of potential between the mains supplying the lights L the magnet C is energized below normal. This will permit the wire V to be cooled so as to lower its resistance and allow current to flow in greater amount through the field-coils S S, thus increasing the strength of the field-magnets and through the reaction of the same on the armature, raising the difference of potential on the main toward normal. If the differences of potential rise above normal, the magnet C closes or tends to close the valve W, upon which the heat of wire V increases, inasmuch as the circulation of the cooling-current of air through the casing T is restricted and the resistance in the circuit to the coils S increases, thus cutting down the field magnetism and lowering the potential on the mains connected with the armature. In practice a slight oscillation of the valve W takes place, which keeps the coil V at a proper temperature to maintain a flow of current in the coils S, adapted to the particular conditions.

It is obvious that the resistance of the coil or conductor V should be a considerable fraction of the total resistance in the derived circuit, including said coil and the coils S.

The arrangement described is particularly useful in counteracting accidental small variations of potential on the mains arising from small changes of speed in the driving-power applied to the armature-shaft of the machine.

When the dynamo is compound wound, so as to give a constant potential at constant speed, the adjustable resistance R may be dispensed with, the rheostat V used alone being adapted to counteract the effects of small variations in the speed of the driving-power.

When the dynamo is compound wound in the proper way to give an increase of volts or potential as the load is increased, which is often the case in machines which compensate automatically for changes in the volts or drop occurring on the supply-mains when of considerable length, the magnet C, instead of having a simple coil in derived circuit, should have an additional coarse-wire coil of very few turns, as indicated at D, Fig. 2, placed in the main or supply circuit leading to the working resistances, and properly wound or connected so as to tend to oppose or counteract the magnetizing influence of the coil C.

The magnetizing influences of the two coils should be so adjusted with relation to one another that upon an increase of current due to increase of load or number of lights the increase of current in the coils D will be just sufficient to counteract the corresponding increase of effective current in the coils C that is due to the normal increase of potential on the mains, provided for purposly, in the compound windings of the machine itself.

Any valve may be used in place of the valve W, Fig. 1—as, for instance, a damper-valve, such as indicated in Fig. 3.

In Fig. 4 a manual device for controlling the flow of the cooling-current of air in the tube or casing T is shown. This device consists simply of a screw, Y, passing through a movable support for the tube T and bearing against a suitable base-plate, whose end at W serves to close the lower end of the tube T when the latter rests on the base. By turning the screw the tube is raised from the base and air allowed to enter to greater or less amount at the base of the tube.

If a very accurate regulation is not required, the coil V may itself be made the magnet-coil for moving the valve W in the direction to shut off the flow of air through the tube. Such a construction is indicated in Fig. 5, where the movable magnet-core attached to the lever-carrying valve W is arranged within the coil V, so as to be drawn down by the action of current in said coils.

In Fig. 6 the adjustable resistance-coil V is shown placed in a shunt around a set of coils, M, so that as the resistance of said coil increases more current will be made to flow in the coils M, while on a decrease of such resistance due to opening of the valve W, the flow of current in the coils M will be diminished. This arrangement is suitable for application to the field-magnet coils of an ordinary direct-current dynamo, whose field is maintained by the current on the main circuit.

In Fig. 7 the coils are shown arranged in direct circuit with a set of coils, S, and with a source of current, B. Any other means external to or independent of the current which flows in the coils V may be used for varying or controlling the temperature of said coil or conductor. A simple device for the purpose which dispenses with the use of a surrounding tube or casing is indicated in Fig. 8. It consists simply of a tube or nozzle, T', which directs a cooling or heating fluid or gas upon the coils. The extent to which the temperature of the coil V is varied by such gas or fluid may be determined by moving the tube or nozzle T' so as to vary the extent to which the coils are immersed in the stream of fluid, or may be determined by the agency of a cock or valve in the tube or nozzle. In the particular instances shown the latter device is indicated, and the movement imparted to such device is secured by the operation of an electro-magnet, C, whose armature is connected with the valve to move the same in one direction, while a spring, X, serves to move said valve in the opposite direction. If the tube T' convey a gas or fluid whose temperature where it immerses the coils is less than the temperature of the coils themselves, as developed by the flow of current in them, the movement of the valve to cut off the flow of the fluid would obviously result in an increase of temperature in the coils V and an increase of resistance in the circuit to the coils S.

In Fig. 9 I have illustrated the employment of a flame as the external means for varying the temperature of the coils V. The flame may be regulated by a valve or cock, W', which can be turned to lower the flame so as to permit the coil V to cool, thus lowering its specific resistance, or may be turned to increase the flame, thus increasing the temperature of the coils V, and causing them to oppose a greater resistance to the flow of current in the circuit in which they are included.

It is obvious that by a proper and obvious rearrangement of the parts a material—such as carbon whose resistance falls with an increase of its temperature—might be used in place of that mentioned.

What I claim as my invention is—

1. An adjustable rheostat consisting, essentially, of a conductor of electricity carrying an electric current, combined with means independent of the heating effects of such current for varying the temperature of said conductor so as to vary its specific resistance, as and for the purpose described.

2. The combination, with an electric conductor whose resistance varies with changes of temperature, of a surrounding tube or casing and a valve controlling the passage of a cooling-current through such casing.

3. The combination, with a magnet-coil, of an artificial resistance connected with the circuit of the same, and consisting of a material whose resistance varies with changes of temperature, and means for varying the temperature of said material so as to vary its specific resistance to the current flowing through it.

4. The combination, with a dynamo-electric machine, of a resistance-coil whose resistance varies by changes of temperature, connected with the field-magnets of said machine, and means independent of the current flowing in the coils for controlling its temperature, as and for the purpose set forth.

5. The combination, with a dynamo-machine having derived-circuit field-coils, of a resistance-coil placed in said circuit and composed of a material whose resistance varies with changes of temperature, an inclosing-case for said coil, and a valve controlling the passages to said case, as and for the purpose described.

6. The combination, with a dynamo-machine having field-coils in derived circuit to the work, of a resistance-coil, V, placed in the circuit of field-coils S, and consisting of a material whose resistance varies with changes of temperature, a tube or casing surrounding said coil, a valve controlling the passage of a cooling agent, and devices responsive to changes in the difference of potential between the mains for controlling said valves.

7. The combination, with field-magnet coils in derived circuit to the work, of a coil in circuit with the field-coil and variable in its resistance by changes of temperature, means external to said coil for controlling its temperature so as to vary its specific resistance, and an electro-magnet responsive to changes in the potential between the mains for controlling the action of the devices governing the temperature of the coil.

8. The combination, with field-magnet coils in a derived circuit to the work, of a coil, V, in circuit with the field-magnet coils, a surrounding casing, T, for said coils, a valve, W, and an electro-magnet, C, placed in derived circuit to the work and controlling the valve.

9. The combination, in an electric regulator, with the controller-magnet C, connected in a circuit or branch uniting mains that supply devices in multiple arc, of a main-circuit coil, D, said coils C D being differentially wound, as and for the purpose described.

Signed at Lynn, in the county of Essex and State of Massachusetts, this 5th day of June, A. D. 1886.

ELIHU THOMSON.

Witnesses:
M. L. THOMSON,
M. E. BINGHAM.